June 8, 1954     H. W. WHIPPLE     2,680,337
HORIZONTALLY REVOLVING STALK SHREDDER Filed March 12, 1952     2 Sheets-Sheet 1

INVENTOR.
Harry W. Whipple,
BY Victor J. Evans & Co.
ATTORNEYS

June 8, 1954        H. W. WHIPPLE        2,680,337
HORIZONTALLY REVOLVING STALK SHREDDER
Filed March 12, 1952        2 Sheets-Sheet 2
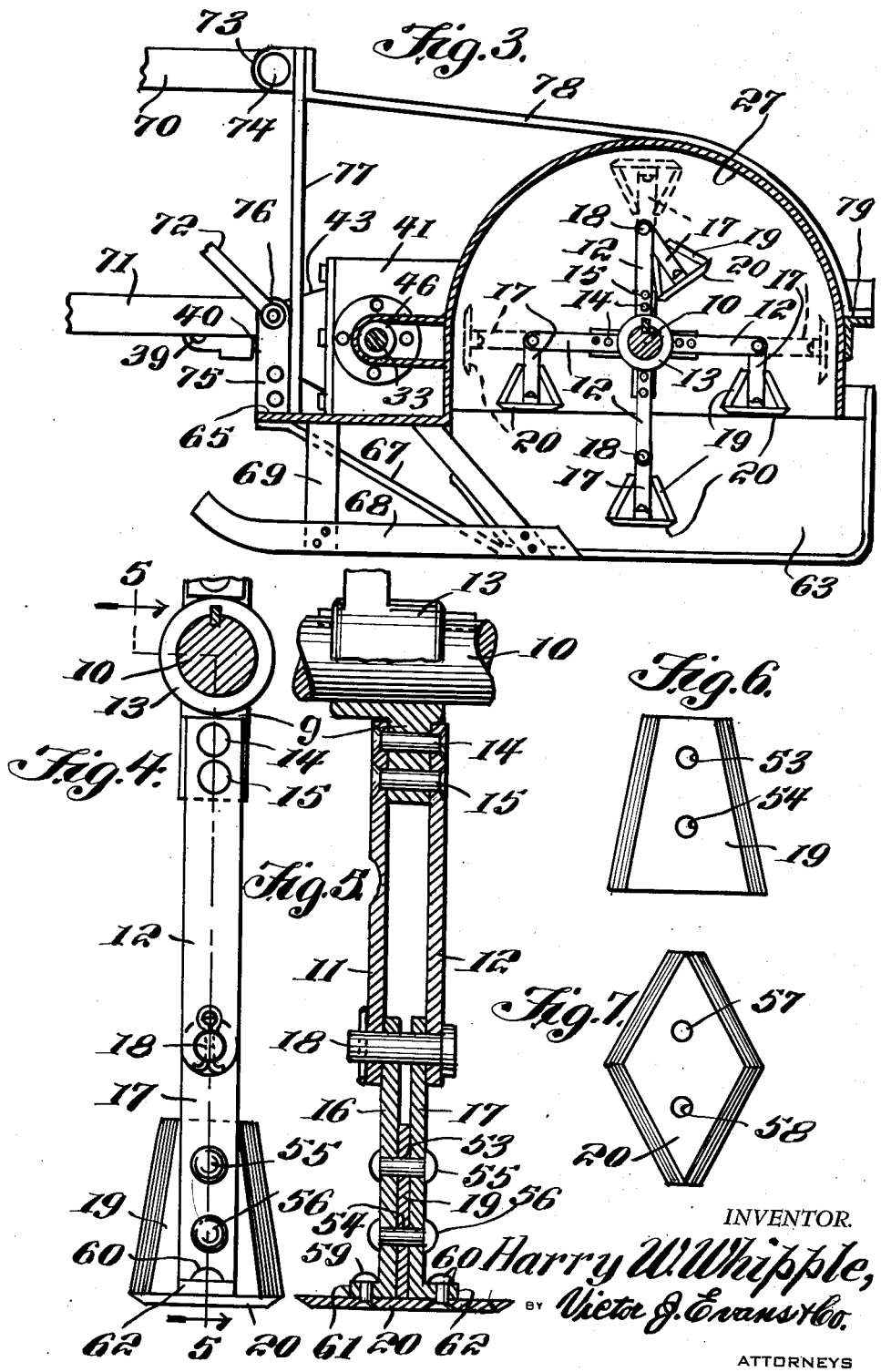
INVENTOR.
Harry W. Whipple,
BY Victor J. Evans & Co.
ATTORNEYS Patented June 8, 1954

2,680,337

UNITED STATES PATENT OFFICE 2,680,337

HORIZONTALLY REVOLVING STALK SHREDDER

Harry W. Whipple, Harlingen, Tex., assignor of one-third to Hugo G. Tomich, Cameron County, and one-third to H. E. Barnum, Hidalgo County, Tex.

Application March 12, 1952, Serial No. 276,117

1 Claim. (Cl. 55—118)

This invention relates to farm implements, and in particular an attachment for a tractor in which the attachment is provided with a plurality of swinging chopping blades mounted on a horizontally disposed shaft in a housing whereby with the attachment drawn over a cotton field after the cotton bolls have been removed the stalks or stock are chopped off at a point slightly above the ground and the parts removed are shredded or pulverized, and deposited upon the ground.

The purpose of this invention is to provide means for pulverizing the remaining stems or stalks of cotton plants after the cotton bolls are removed in order to obtain the highest possible kill on boll weevil and pink boll worms.

In the usual cotton fields the stalks of the plants remain in substantially upright positions and the boll weevil and pink boll worms continue to feed on the stalks. Various types of devices have been provided for raking and otherwise removing the stalks from the fields and it is also necessary to add fertilizer to the soil to compensate for the products removed from the soil with each crop. With this thought in mind this invention contemplates a device that when drawn over a cotton field chops and shreds the stalks of the cotton whereby the nests and food for boll weevil are destroyed and so that the plants may be returned to the soil.

The object of this invention is, therefore, to provide means for mounting a plurality of chopping blades whereby the blades, when drawn over a cotton field after the cotton bolls are removed, cut the stalks just above the ground and chop the stalks into comparatively fine particles.

Another object of the invention is to provide a cotton stalk shredding machine which cuts stalks positioned vertically, laterally, and at substantially any angle between a vertical and a horizontal position.

A further object of the invention is to provide a cotton stalk shredding machine which is of a simple and economical construction.

With these and other objects and advantages in view the invention embodies a horizontally disposed shaft having spaced radially disposed arms extended therefrom with vertical and horizontally disposed blades carried by levers pivotally mounted on the ends of the arms and means for enclosing and mounting the shaft whereby it may be attached to a tractor and rotated from a power take off connection of the tractor.

Other features and advantages of the invention will appear from the following description taken in connection with the drawings, wherein:

Figure 3 is a longitudinal section through the device illustrating the positions of the cutting elements in relation to guide bars or shoes that travel on the ground.

Figure 4 is a detail, on an enlarged scale, illustrating one of the cutting blade carrying arms.

Figure 5 is a longitudinal section taken on line 5—5 of Fig. 4 illustrating the construction of one of the blade carrying arms.

Figure 6 is a detail illustrating one of the vertically disposed blades of the device.

Figure 7 is a similar view showing one of the horizontally disposed blades.

Figure 1:
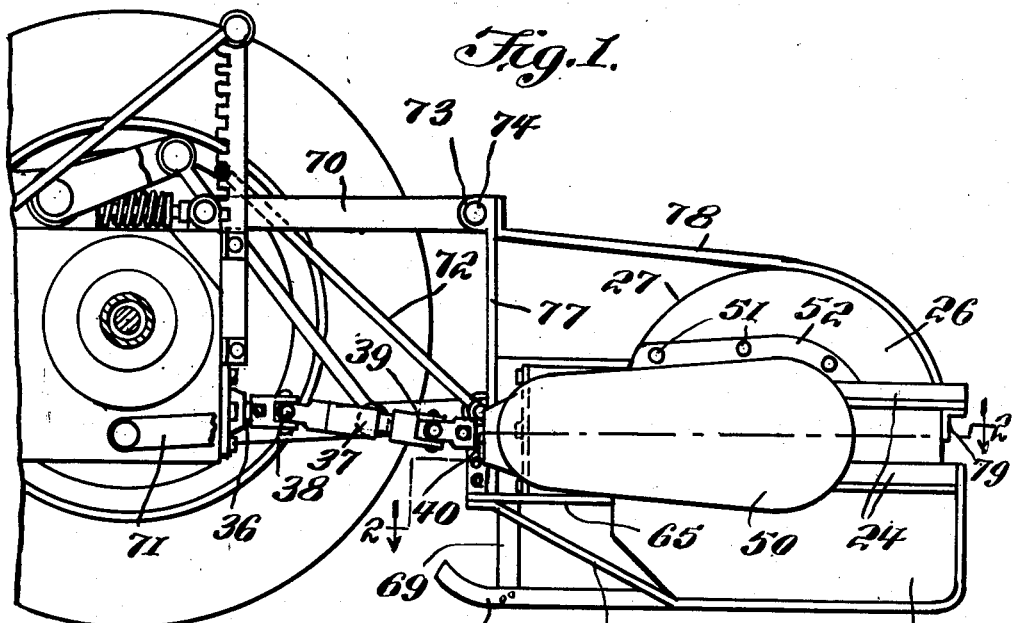
Figure 1 is a side elevational view of the attachment illustrating the position thereof in relation to a tractor to which it is connected.

Referring now to the drawings wherein like reference characters denote corresponding parts the improved cotton stock shredding machine of this invention includes a shaft 10 having radially disposed arms including plates 11 and 12 secured to arms 9 extended from hubs 13 on the shaft with rivets 14 and 15, blade carrying levers 16 and 17 pivotally mounted in the ends of the arms with pins 18, vertically disposed blades 19 positioned between the levers 16 and 17 and horizontally disposed blades 20 mounted on the ends of the levers, said device being mounted in a suitable housing and said housing having suitable guide and attaching means and also means for driving the shaft from the power take off of a tractor.

Figure 2:
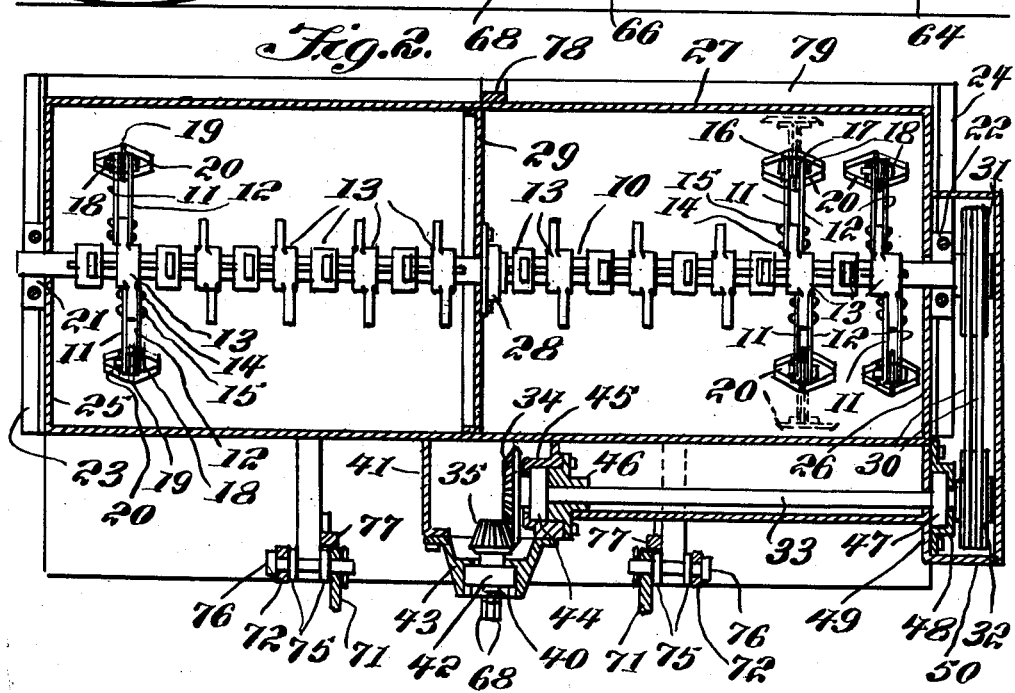
Figure 2 is a sectional plan through the attachment being taken on line 2—2 of Fig. 1.

In the design shown the shaft 10 is journaled in bearings 21 and 22 on horizontally disposed bars 23 and 24 carried by end plates 25 and 26 of substantially semi-cylindrical housing 27, as shown in Fig. 2. The shaft is also supported at the center with a bearing 28 which is mounted on a partition 29 extended through the center of the housing.

The shaft is rotated by belts 30 trained over a pulley 31 on the shaft and also over a pulley 32 on a countershaft 33 that is driven by beveled gears 34 and 35 from a power take off 36 through a telescoping shaft 37 having universal joints 38 and 39 therein, the gear 35 being mounted on a stub shaft 40, extended from the universal joint 39.

The gears 34 and 35 are mounted in a gear case 41, the stub shaft 40 being journaled in a bearing 42 in a cap 43 at one end of the case and the shaft 33 being journaled in a bearing 44 in a cylindrical section 45 at one side of the case. The bearing 44 is secured in position with a bushing 46. The opposite end of the shaft 33 is mounted with a bearing 47 in a bearing cap 48 on a section 49 at one end of the housing. The pulleys 31 and 32 and belts 30 are covered with a casing 50 that is secured to the end of the housing with bolts 51 in a flange 52 on the edge thereof.

The blade 19 is provided with openings 53 and 54 that are positioned to receive rivets 55 and 56, respectively, extended through corresponding openings in the levers 16 and 17, as shown in Figs. 4 and 5. The blade 20 is also provided with openings as indicated by the numerals 57 and 58, and these openings are positioned to receive rivets 59 and 60, respectively extended through flanges 61 and 62 on the end of the levers 16 and 17, as shown in Fig. 5.

As illustrated in Fig. 3 the housing 27 is provided with end sections or skirts 63 and 64 and the gear case 41 is mounted on a horizontally disposed plate 65 carried by the forward side of the housing. The end sections 63 and 64 are supported from the housing and also from the plate 65 with struts 66 and 67 and a dividing shoe 68, the forward end of which is also attached to one of the struts 66, is supported at the opposite end with a strut 69. The dividing shoe 68 parts the stalks moving the stalks toward either side where they will be cut by the cutters, and the end sections or skirts 63 and 64, hold the vacuum into the machine and also elevate the housing over hummocks and the like to prevent the blades cutting into the ground.

The housing is also provided with a truss link 70 and a lock bar 72, the link 70 being connected to ears 73 with a pin 74 and arms 71 being attached to struts 75 on the plate 65 with pins 76 on which the bar 72 is mounted. The ears 73 are provided on the upper ends of a strut 77 that is secured to the housing 27 with a strap 78. The end of the strap 78 extends over the housing 27 and the forward end is attached to a transversely disposed angle 79 and, as illustrated in Fig. 2, the ends of the members 23 and 24 are also secured to the ends of the angle bar 79.

The link 70 and arms 71 may be mounted on the attachment by other suitable means and the opposite ends may be attached to parts of the tractor as desired.

It will also be understood that the connections of the struts 77, lock bar 72 and the members 71 and 75 may be formed to correspond with different types of tractors to which the attachment is connected or upon which the attachment is mounted.

With the attachment provided in this manner and attached to a tractor by suitable means the housing is drawn across the field with the lower edge of the housing spaced above the ground, and as the shaft 10 is rotated by the power take off of the tractor the cutting blades swing around the shaft, as illustrated in Fig. 3 with the horizontally disposed blades chopping stalks that are vertically positioned and with the radially extended blades chopping stalks that slant or are in horizontally disposed positions. By this means the cotton stalks are chopped and substantially shredded or pulverized and the final product is returned to the soil whereby the substance removed from the soil by the growth of the plants is returned.

It will be understood that modifications, within the scope of the appended claim, may be made in the design and arrangement of the parts without departing from the spirit of the invention.

What is claimed is:

In a vegetation shredder, the combination which comprises a transversely disposed shaft, a transversely extending housing having a lower end in which the shaft is rotatably mounted with the shaft spaced above the lower end of the housing, hubs having arms extended therefrom mounted on said shaft, a pair of parallel plates secured to the arms of the hubs and extended radially from the shaft, spaced levers positioned between the plates and extended therefrom, pins extended through the plates and levers for pivotally mounting the levers in the extended ends of the plates, cutting blades positioned between and secured to the levers, said blades having cutting edges converging from the extended ends toward the pivotal mounting points thereof, said levers having flanges positioned at right angles thereto, on extended ends thereof, and diamond shaped cutting blades secured to said flanges and positioned perpendicular to the levers and plates with the levers and plates vertically positioned, the pivotal points at which the levers are connected to the plates being positioned whereby the length of the levers is less than that of the plates.

References Cited in the file of this patent

UNITED STATES PATENTS

| Number | Name | Date |
|---|---|---|
| 1,698,724 | Johnston et al. | Jan. 15, 1929 |
| 2,506,054 | Agee et al. | May 2, 1950 |
| 2,597,485 | Hillyer | May 20, 1952 |